Nov. 6, 1923.  1,473,108

J. M. LEA

BATTERY PLATE TREATING APPARATUS

Filed Dec. 27, 1921

Inventor
John M. Lea
By his Attorneys
Blackmore, Spencer & Flint

Patented Nov. 6, 1923.

1,473,108

UNITED STATES PATENT OFFICE.

JOHN M. LEA, OF DETROIT, MICHIGAN.

BATTERY-PLATE-TREATING APPARATUS.

Application filed December 27, 1921. Serial No. 525,118.

*To all whom it may concern:*

Be it known that I, JOHN M. LEA, a citizen of the United States, and a resident of Detroit, county of Wayne and State of Michigan, have invented certain new and useful Improvements in Battery-Plate-Treating Apparatus, of which the following is a full, clear, concise, and exact description, such as will enable others skilled in the art to which the invention relates to make and use the same, reference being made therein to the accompanying drawings, which form a part of this specification.

The invention relates to apparatus for subjecting articles, such, for example, as lead storage battery plates, to treatment with a fluid, and includes, in the specific embodiment hereinafter described, means for causing liquid under pressure to penetrate or flow through a porous or permeable paste supported upon a frame or grid.

The principal object of the invention is to provide mechanism adaptable readily to either manual or automatic actuation and capable of applying liquid under pressure to pasted battery plates rapidly and effectively to cause the liquid to penetrate and flow through the paste.

A further object is to provide means whereby a plurality of plates, or the like, may be simultaneously treated and whereby the treatment may be readily applied either to one side only of each plate or first to one side of the plate and then to the other.

Other objects and advantages will appear from the following description taken in connection with the accompanying drawings, in which—

Figures 1, 2, 3:
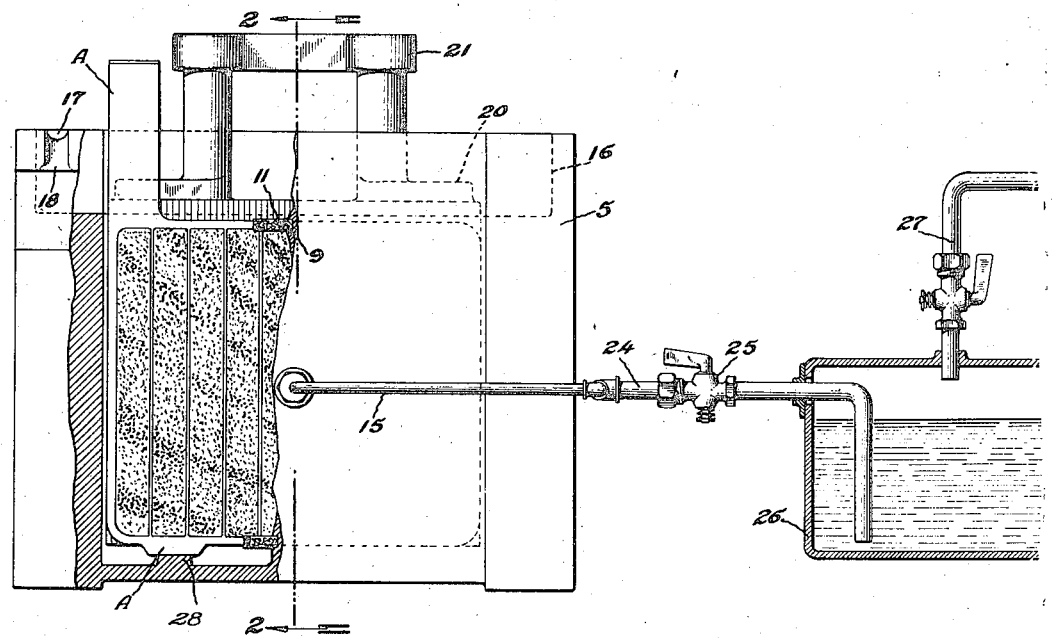
Fig. 1 is an elevation partly in section illustrating one embodiment of the invention.
Fig. 2 is a section taken on line 2—2 of Fig. 1.
Fig. 3 is a perspective view of one form of clamping or expanding device constituting one feature of the invention.

Referring to the drawings, 5 indicates a receptacle which may be formed in any desired manner and is preferably closed at the bottom in order to maintain therein a bath of liquid. The material of the receptacle will depend, of course, upon the character of the liquid to be contained therein, and when the liquid employed is of corrosive character, as a sulphuric acid solution, the surfaces with which it contacts will be preferably of a non-corrodible material, such as lead or one of its alloys.

The interior of the receptacle is suitably shaped to provide a support or supports for the plates or like articles to be treated. As shown, two opposed surfaces 6, 7, are provided of size and shape suitable to support plates A, which may be pasted plates designed for electric storage batteries. Grooves 8, 9, are formed in the surfaces 6, 7, to receive packing or sealing devices 10, 11, respectively, so arranged as to contact with the peripheral portions of the plates A and form a liquid-tight seal to prevent escape of liquid around the edges of the plates when the latter are pressed against the sealing means. The grooves may be made relatively deep, as shown, so that the packing of suitable resilient material may be securely retained with the projecting portion extending beyond the surface sufficiently to insure adequate flexibility and accommodation to irregular plate surfaces.

Cavities or chambers 12, 13, are formed in the walls of the receptacle 5 in the rear of the surfaces 6, 7, respectively in order to provide adequate space for the flow of liquid to all portions of the plate included within the sealing means 10 or 11. Suitable conduits 14, 15, are arranged to supply liquid to the interior of the cavities 12, 13, respectively.

Above the supports 6, 7, the receptacle is enlarged, as indicated at 16, to provide increased capacity for the interior of the receptacle for a reason to be explained later.

Overflow means is arranged at some convenient point, as indicated at 17, which may comprise, as shown, a channel through which the liquid may flow from the chamber 16 to the exterior of the receptacle. Any suitable indicating means to disclose the rate of flow may be provided if desired. As shown, the channel 17 leads to a lip or spout 18 adapted to discharge to any suitable means for receiving the overflow, the rate of discharge serving to indicate the rapidity with which the liquid is passing through the plate or plates.

Means is provided to clamp or hold the plates or like articles in liquid-tight engagement with the sealing means 10, 11, comprising, in the embodiment illustrated, a member 20 adapted to be lowered into the receptacle between the plates and to force them in opposite directions against their respective supports and sealing means. As illustrated, the member 20 is of wedge shape and the faces of the supports 6, 7, are arranged at an upwardly diverging angle corresponding to the angle of the tapered or wedge shaped body 20. The angle is made preferably of such obliquity that the plates or the like may be retained in position with sufficient pressure to prevent leakage past the packing devices by the mere weight of the body 20, which may be of lead or similar material and may be readily made of considerable weight. A handle 21 may be provided if it is desired to raise and lower the body 20 manually. It will be readily understood, however, that mechanical actuation may be provided for without departing from the scope of the invention and that additional means may be provided for applying pressure to maintain the plates in position while under treatment.

The surfaces of the body 20 which are designed to engage with the plates are so formed as to provide numerous points of contact with the plate surface in order to counteract the pressure exerted upon the rear faces of the plates by the liquid applied thereto. The form is also such as to permit the liquid to be readily discharged from the plate and escape to the interior of the receptacle or chamber 16 as it passes through the material of the plates. For this purpose the surfaces of the body 20 are preferably provided with vertical grooves as illustrated in Fig. 3, the ridges 22 being designed to contact with the surface of the plate and the intervening channels 23 serving to convey the liquid away from the surfaces of the plates. By this means it will be seen that the liquid may be applied to the surfaces of the plates exposed to the chambers 12, 13, with considerable pressure without causing distortion of the plates or loosening of the material therefrom. The arrangement of ridges extending in a direction approximately parallel to the direction of movement of the holding member is of especial advantage in that it enables the plates to be clamped without a scraping action such as might dislodge or loosen the soft or friable plate material, since the slight movement required to clamp the plates after the wedge block comes into engagement with the plate surface results merely in a slight sliding movement in the direction of the ridges.

In utilizing the apparatus for the treatment of pasted lead battery plates with dilute sulphuric acid solution, I have found it possible to apply the liquid under a pressure of as high as five pounds per square inch without loosening the paste from the grid even where the treatment has been applied to freshly pasted plates.

Any suitable means may be provided whereby liquid may be supplied under pressure to the chambers 12, 13, such means being illustrated as comprising a supply pipe 24, control of flow through which may be had by means of a valve 25. The pipe leads from a container 26, the liquid in which may be maintained under pressure by compressed gas supplied through the conduit 27. Any other suitable means may be utilized, of course, to supply the treating liquid under the desired pressure. In the use of the apparatus, I have found it convenient to so adjust the capacity of the pipe 24 that it is capable of supplying liquid at a rate somewhat in excess of that at which the liquid will normally pass through the plates. While treated plates are being replaced by those to be treated the flow may therefore continue without interruption, thus insuring the maintenance of a predetermined strength of solution in the receptacle.

Ribs 28 may be provided on the bottom or floor of the receptacle 5 in order to provide elevated supports for the plates under treatment. The space between the ribs will then constitute a sump in which any sediment or detritus may be permitted to accumulate without interfering with the proper positioning and clamping of the plates.

It will be seen that the apparatus described provides means whereby plates or like articles may be conveniently and expeditiously subjected to the action of liquid under pressure from one side only or from opposite sides alternately. If the treatment is to be applied from one side only, an entirely new set of plates will be positioned within the receptacle 5 in each cycle of operation in the apparatus. If, on the other hand, it be desired to treat the plates alternately on opposite sides, the plates may be inserted successively from one side of the receptacle and removed from the other, each plate after having been treated for the desired length of time by liquid under pressure on one side being merely moved over to the opposite side of the body 20 after the latter has been lifted from the receptacle, a new plate placed in the position from which the first has just been moved and the body 20 thereupon replaced, after which, as will be obvious, the first plate will be in position to receive liquid under pressure from the side opposite to that which has already been treated. Either of these operations obviously lends itself to mechanical feeding and removing of the plates if it be desired to utilize the apparatus for automatic or semi-automatic supply of plates.

The capacity of the chamber or enlargement 16 is preferably made such that upon the removal of the body 20 and the plate or plates to be replaced the level of liquid within the receptacle will still be above the upper end of the chambers 12, 13, in order that air pockets may not be formed in the rear of the plates when treatment begins.

The maintenance of a level of liquid in the receptacle sufficient to provide a bath in which the plates may be immersed at the beginning of the treating operation is also useful in connection with the treatment of freshly pasted storage battery plates with electrolyte in that it enables the paste to be slightly hardened before applying the pressure treatment thereto.

Various changes in details of construction and operation may, of course, be made without departing from the scope of the invention as set forth in the appended claims and therefore I do not wish to be limited to the specific construction herein disclosed except as required by the language of the claims and the prior art.

I claim:

1. Apparatus for applying fluid under pressure to the surfaces of plates comprising a support adapted to receive a plurality of plates, means adapted to be interposed between said plates to force the same against said support, and means adapted to supply fluid under pressure to one side of each of said plates.

2. Apparatus for treating plates comprising a receptacle having interior faces each adapted to receive and support a plate, means adapted to be positioned in engagement with said plates on the side opposite said faces to force the same against said faces, and means for supplying liquid to the surfaces of said plates remote from said forcing means.

3. Apparatus for treating plates comprising a receptacle having interior faces each adapted to receive and support a plate, cavities being formed in said faces adapted to be covered by said plates when properly positioned, means for forcing said plates into liquid-tight engagement with said faces, and means for supplying liquid under pressure to said cavities, said forcing means constructed and arranged to permit drainage of liquid to the interior of said receptacle from the sides of said plates opposite said faces.

4. Apparatus for treating plates comprising a support having opposed faces, each adapted to effect fluid-tight engagement with a portion of a plate, a tapered body insertible between said plates and adapted to force the same against said faces, and means for supplying fluid to cause the same to penetrate the material of said plates.

5. Apparatus for treating plates comprising a support having opposed faces, each adapted to effect fluid-tight engagement with a portion of a plate, a tapered body insertible between said plates and adapted to force the same against said faces, the surfaces of said body being grooved to permit flow of fluid from the surfaces of said plates, and means for supplying fluid under pressure to the portions of said plates opposite said body to cause the fluid to flow through the plates.

6. Apparatus for treating plates comprising a support having opposed faces, each adapted to effect fluid-tight engagement with a portion of a plate, a tapered body insertible between said plates and adapted to force the same against said faces, the surfaces of said body being formed in such a manner as to permit the discharge of liquid from the plates and substantially support the plate material against movement in the direction of the pressure, and means for supplying liquid under pressure to portions of said plates opposite said body.

7. Apparatus for treating plates comprising a support having a surface adapted to receive and effect liquid-tight engagement with a plate, a wedge member insertible between a fixed abutment and a plate positioned on said surface, said wedge member provided on the plate-engaging side with alternate ridges and grooves extending in the direction of movement of said wedge member, and means for supplying liquid under pressure to the side of said plate opposite the wedge member.

8. A support and a clamping member co-operating with a fixed abutment for securing a plate or the like to said support, said clamping member comprising a tapered body, the plate-engaging surface thereof being provided with alternate ridges and grooves.

In testimony whereof I affix my signature.

JOHN M. LEA.